(12) United States Patent
Coleman, II et al.

(10) Patent No.: US 6,312,034 B1
(45) Date of Patent: Nov. 6, 2001

(54) VEHICLE BED AND CARGO AREA LINER WITH INTEGRATED SLIDING FLOOR EXTENSION

(75) Inventors: James C. Coleman, II, Cincinnati; Franklin L. Mink, Loveland, both of OH (US)

(73) Assignee: Mink & Associates LLC, Loveland, OH (US)

( * ) Notice: Subject to any disclaimer, the term of this patent is extended or adjusted under 35 U.S.C. 154(b) by 0 days.

(21) Appl. No.: 09/494,058

(22) Filed: Jan. 28, 2000

Related U.S. Application Data
(60) Provisional application No. 60/167,093, filed on Nov. 23, 1999.

(51) Int. Cl.[7] ....................................... B62C 1/06
(52) U.S. Cl. ................. 296/26.1; 296/26.09; 296/39.2
(58) Field of Search ............................ 296/26.08, 26.09, 296/26.13, 39.2; 414/522

(56) References Cited

U.S. PATENT DOCUMENTS

| | | | |
|---|---|---|---|
| 2,678,139 | 5/1954 | Gildersleeve | 108/51.15 X |
| 3,064,836 | 11/1962 | Rupert | 414/552 |
| 3,315,973 | 4/1967 | Marple | 296/26.09 X |
| 3,471,045 | 10/1969 | Panciocco | 414/522 |
| 3,581,681 | 6/1971 | Newton | 108/57.28 |
| 3,726,422 * | 4/1973 | Zelin | 296/26.09 |
| 4,023,850 | 5/1977 | Tillery | 296/26 |
| 4,231,695 | 11/1980 | Weston, Sr. | 296/35.3 X |
| 4,531,773 | 7/1985 | Smith | 296/26 |
| 4,685,857 | 8/1987 | Goeser et al. | 414/522 |
| 4,830,242 * | 5/1989 | Painter | 296/26.09 |
| 4,950,123 * | 8/1990 | Brockhaus | 296/26.09 |
| 4,979,772 | 12/1990 | Carey et al. | 296/39 |
| 4,993,088 * | 2/1991 | Chudik | 296/26.09 |
| 5,064,335 * | 11/1991 | Bergeron et al. | 296/26.09 |
| 5,083,830 * | 1/1992 | Mucher et al. | 296/39.2 |
| 5,090,335 | 2/1992 | Russell | 108/44 |
| 5,098,146 | 3/1992 | Albrecht et al. | 296/26.09 |
| 5,110,171 | 5/1992 | Anthony | 296/39.2 |
| 5,269,447 | 12/1993 | Gower et al. | 225/42.42 |
| 5,322,335 | 6/1994 | Niemi | 296/97.23 |
| 5,456,511 | 10/1995 | Webber | 296/26 |
| 5,513,941 | 5/1996 | Kulas et al. | 414/522 |
| 5,544,998 | 8/1996 | Malinowski | 414/522 |
| 5,562,321 | 10/1996 | VanHoose | 296/39.1 |
| 5,564,767 * | 10/1996 | Strepek | 296/26.09 |
| 5,634,408 | 6/1997 | Jarkowski | 108/44 |
| 5,649,731 * | 7/1997 | Tognetti | 296/26.09 |
| 5,685,593 | 11/1997 | O'Connor | 296/39.2 |

(List continued on next page.)

*Primary Examiner*—Joseph D. Pape
*Assistant Examiner*—Kiran B. Patel
(74) *Attorney, Agent, or Firm*—Eric W. Guttag; Smith, Guttag & Bolin, Ltd (57) ABSTRACT

A truck bed or vehicle cargo liner with integrated sliding bed extension including a drop-in truck bed liner or cargo liner (16) formed of composite/plastic materials with one or more molded composite/plastic or metal rails (18) integrally formed or attached to the structure of the liner (on the floor and/or liner walls) and a bed/floor extension plate (20) of lightweight molded composite/plastic materials or metal plating (encased or not within a shell of composite materials) or a combination of the two in which the underside and/or sides has/have one or more composite tracks (22) integrally formed or attached to the structure of the extension plate for mounting said plate to the previously referenced rail/rails. The extension plate further includes a locking mechanism composed of a handle at the rearward-most end connected via a cable or other mechanical attachment device to one or more spring-loaded locking pins protruding outwardly from the inside of each molded track located at the end of the extension plate nearest to the front of the bed for the purpose of filling/locking/securing into drilled/molded holes in the rails at spaced intervals, thus allowing the extension plate to be extended and locked at various lengths.

10 Claims, 11 Drawing Sheets

U.S. PATENT DOCUMENTS

| | | | |
|---|---|---|---|
| 5,700,047 | 12/1997 | Leitner et al. | 296/26 |
| 5,755,480 | 5/1998 | Bryan | 296/26 |
| 5,816,637 | 10/1998 | Adams et al. | 296/26.09 |
| 5,820,190 * | 10/1998 | Benner | 296/26.09 |
| 5,938,262 * | 8/1999 | Mills | 296/26.09 |
| 5,944,371 * | 8/1999 | Steiner et al. | 296/26.09 |
| 5,967,056 | 10/1999 | Plante | 108/57.17 X |
| 5,967,672 | 12/1999 | Hodgetts | 428/192 |
| 5,992,915 * | 11/1999 | Thompson et al. | 296/39.2 |
| 6,059,339 | 5/2000 | Madson | 296/26.01 |
| 6,065,792 * | 5/2000 | Sciullo et al. | 296/26.09 |

* cited by examiner

FIG. 7 SIDE VIEW OF SUV VERTICAL SUPPORT BAR (SVSB) ADJUSTABLE RETENTION MECHANISM

FIG. 8 TOP VIEW OF SUV HORIZONTAL SUPPORT BAR (SHSB) ADJUSTABLE RETENTIION MECHANISM

FIG. 10 TOP VIEW OF SPRING LOADED PIN ASSEMBLEY (SLPA)

FIG. 11 CROSS SECTION OF SLPA & RAIL TRACK ASSEMBLY

VEHICLE BED AND CARGO AREA LINER WITH INTEGRATED SLIDING FLOOR EXTENSION

BACKGROUND—CROSS-REFERENCE TO RELATED APPLICATIONS

This application is entitled to the benefit of Provisional Patent Application Ser. No. 60/167,093, filed Nov. 23, 1999.

BACKGROUND—FIELD OF THE INVENTION

This invention relates to truck beds and drop-in truck bed liners therefore, rear cargo areas of motor vehicles such as sport utility vehicles (SUVs), station wagons and vans and cargo liners therefore and, more particularly, to a composite/plastic truck bed liner or cargo liner with a sliding extension plate of lightweight molded composite/plastic or metal plating surrounded or not by molded composite mounted on one or more composite and/or metal rails integrally molded or attached to the structure of the bed/cargo liner.

BACKGROUND—DISCUSSION OF PRIOR ART

The present invention relates to motor vehicles (i.e., pickup trucks, SUVs, vans, etc.), specifically relating to an improvement in the utility of the cargo area of such vehicles. With the proliferation of compact, mid-size and full-size pickup trucks with short beds, generally ranging from 4 to 6.5 feet in length, limitation is placed on the ability of truck owners to effectively haul longer items typically accommodated by longer beds (e.g., a 4 foot×8 foot sheet of plywood).

Several approaches have been employed by previous inventors to expand the cargo carrying capacity of pickup truck beds. For example, U.S. Pat. No. 4,023,850 to Tillery (1977), U.S. Pat. No. 4,531,773 to Smith (1985) and U.S. Pat. No. 5,755,480 to Bryan (1998) disclose tailgate extension devices to provide for a longer bed floor area. While these inventions do provide for an expanded cargo floor area, steps necessary for their assembly and regular use are relatively complex and when not in use as a bed extension, the devices serve no alternative beneficial purpose.

Another approach is presented in U.S. Pat. No. 5,700,047 to Leitner, et al. (1997) which discloses a U-shaped "truck bed extender" that can be mounted to the walls of the rear portion of a pickup bed and rotated inside the bed to serve as a storage/retaining compartment for loaded items or outside the bed onto the lowered tailgate to effectively expand the enclosed cargo area. While retention is provided for cargo items that extend onto the lowered tailgate, this invention does not truly expand the truck bed cargo area floor.

Another approach to the expansion of the cargo carrying capacity of a pickup truck bed employed by previous inventors involves the development of an expandable/retractable bed in which the walls and floor of the bed itself have the ability to extend to accommodate larger load items and retract to a shortened bed length. Examples of this approach are given in U.S. Pat. No. 4,950,123 to Brockhaus (1990) and U.S. Pat. No. 5,816,637 to Adams, et al. (1998). While these inventions provide for an expanded cargo area via extension of bed walls and floor, their construction and installation is necessarily complex, where the expansion mechanism is a duplicative element in the manufacture of an entire truck bed.

Still another approach, with observed examples focusing more on increased ease of access to stored cargo items than for bed extension, involves the development of plates that slidably engage the floor of the pickup bed cargo area floor via roller means. Several examples of this approach are presented in the following patents: U.S. Pat. No. 5,456,511 to Webber (1995), U.S. Pat. No. 5,513,941 to Kulas et al. (1996), U.S. Pat. No. 5,649,731 to Tognetti (1997), and U.S. Pat. No. 5,938,262 to Mills (1999). While these inventions provide ease of access to loaded cargo items and potentially an expanded cargo area floor, their construction is unnecessarily complex and incorporates invasive mounting mechanisms, which in most if not all cases require drilling holes into the floor or walls of the truck bed. Also, the roller means by which the load floor/plate engages the floor of the cargo area is susceptible to mechanical failure during the course of typical usage of a truck bed cargo area (i.e., rollers inhibited by dirt and debris or broken/damaged as a result of loading and hauling of heavy items). Also, examples of such inventions currently available from aftermarket manufactures are relatively expensive (ranging from approximately $700 to $2,000) due in part to their complexity and manufacturing cost.

Concerning the proliferation of multiple purpose vehicles such as SUVs, vans and station wagons, the rear cargo area of such vehicles is subjected to a diverse range of uses by consumers such as hauling groceries, luggage, landscaping materials, outdoor gear/sports equipment, etc. A problem faced by owners of such vehicles is how to protect the upholstery of the cargo area from damage associated with the loading and retrieval of cargo, as well as from dampness and dirt associated with certain load items. Another problem faced by owners of such vehicles is how to restrain and/or separate loaded cargo during travel. An additional problem is the discomfort and potential for back injury associated with the necessity of leaning into the cargo area for loading and unloading heavy cargo items.

The issue of protection of the upholstery of a multiple purpose vehicle cargo area has been addressed by a number of inventors through the development of cargo area liners of various types. Some examples of this type of invention are given in U.S. Pat. No. 4,979,772 to Carey, et al. (1990), U.S. Pat. No. 5,110,171 to Anthony (1992), and U.S. Pat. No. 5,322,335 to Niemi (1994). These inventions serve well for protection of the interior of the cargo area but do not address the other previously identified problems.

The further evolution of multiple purpose vehicle cargo area liners has involved the adaptation of various types of divider mechanisms to mount to the liner to address the need to separate and/or restrain cargo items during travel. Examples of this improvement are disclosed in U.S. Pat. No. 5,269,447 to Gower, et al. (1993), U.S. Pat. No. 5,562,321 to VanHoose (1996), and U.S. Pat. No. 5,976,672 to Hodgetts (1999). While these inventions address the need for both interior protection and cargo retention, they do not offer a solution to the problem of potential injury from leaning into the cargo area for loading/unloading heavy cargo items.

An approach to addressing all three problems stated previously can be seen in U.S. Pat. No. 5,634,408 to Jarkowski (1997) in which an invention is disclosed involving a vehicle cargo tray which lines the floor of the cargo area and can extend outward via roller means so as to slide beyond the open cargo area for loading. Interior protection and cargo retention devices are also included in this invention. However, the construction of such invention, involving moving parts such as roller means, presents the opportunity for mechanical malfunction associated with the typical use of a multiple purpose vehicle cargo area (i.e., roller means inhibited by dirt/debris or damaged from loading/carrying heavy items) as well as significantly increased cost to potential consumers.

SUMMARY

In accordance with the present invention, a liner for a motor vehicle (i.e., pickup truck, SUV, van, etc.) cargo area provides a protective mounting platform for a multifunctional slidable floor plate movable from a secure stored position to a locked extended position.

Objects and Advantages

Accordingly, several objects and advantages of the present invention are:

(a) to provide a truck bed liner with an integrated sliding floor extension to increase the utility of shorter beds for hauling longer items;

(b) to have the sliding floor extension be available for increasing ease of loading and unloading of items stored in the bed or cargo area, rather than leaning into the bed compartment from the side or rear or into the vehicle cargo area to load or retrieve a cargo item;

(c) to provide a drop-in bed liner and cargo area liner with an integrated sliding floor extension/load floor that would require no special alterations to the structure of the existing truck bed or cargo area for mounting (i.e., no drilling of holes in the bed/cargo area for mounting would be required);

(d) to provide a drop-in bed liner and cargo area liner with an integrated sliding floor extension/load floor in which the extension plate engages the floor of the liner via a simple rail/track assembly the structure of which is simple in its operation as well as its manufacture (i.e., includes no or few moving parts and is resistant to mechanical malfunction during typical use); and (e) to provide a drop-in bed liner and cargo area liner with an integrated sliding floor extension/load floor exhibiting molded/drilled holes for mounting cargo dividers/restraining devices, toolboxes or other such items.

Given the nature of the present invention as a liner, not only is protection against damage provided to the interior of a truck bed or multiple purpose vehicle cargo area, but the liner provides an ideal platform for noninvasive mounting of the reinforced sliding floor extension plate. The invention uniquely provides an integration of a liner for a cargo area of a motor vehicle (i.e., pickup truck or multiple purpose vehicle) with a simplified rail/track assembly for increasing ease of access to cargo, extension of a pickup bed load floor (approximately 70 percent of truck bed length), and provision of a multifunctional platform for mounting of cargo dividers/restraining devices, toolboxes, coolers, canoe racks or other such items a manufacturer would see appropriate to adapt to the invention with respect to a particular application.

DESCRIPTION OF THE INVENTION

A drop-in truck bed liner with integrated sliding bed extension is provided. The drop-in bed liner with integrated sliding bed extension includes a drop-in truck bed liner formed of composite/plastic with one or more molded composite/plastic or metal rails (encased or not in molded composite) integrally formed or attached to the structure of the liner and a bed extension plate of lightweight molded composite/plastic materials or metal plating (encased or not within a shell of composite materials), the underside or sides of which (depending on whether the previously referenced rail/rails are located in the floor or the walls of the liner) has/have one or more composite/plastic and/or metal tracks integrally formed into the structure of the extension plate for mounting said plate to the previously referenced rail/rails. An exemplary embodiment of the sliding bed extension plate would have peg-receiving holes drilled/molded therein for mounting/installation of cargo restraining devices, cargo dividers, specialized containers or other such items deemed suitable for this type of application by a manufacturer. For structural support needed when the extension plate is in the extended position and supporting the weight of a loaded item, vertical (metal and/or reinforced composite/plastic) support rods would be molded into or attached to the structure of the liner at the front of the bed continuous with the previously referenced rail/rails with the top of the rod/rods secured under the bed rail to distribute weight to the front of the truck cargo area. Also included in this skeletal support system is one or more metallic or reinforced composite/plastic and/or metal cross-braces molded into or attached to the structure of the bed liner perpendicular to and underneath the rails.

The sliding bed extension can also be provided with a locking mechanism so that the bed extension plate is movable from a stored and locked position within the cargo area to an extended position partially outside the cargo area. In this embodiment, the one or more rail assemblies each have opposing pairs of spaced apertures therein for receiving one or more pin members. The one or more track assemblies that slidably engage the rail assemblies each have an aperture at one end thereof for receiving a pin member. The locking mechanism has a handle attached to the one or more pin members such that the handle is operable to engage the pin members in the respective aperture of the rail assemblies to lock the extension plate in position and to disengage the one or more pin members in the respective apertures of the rail assemblies to lock the extension plate in a first position and to disengage the one or more pin members from the respective apertures of the rail assemblies to permit the extension plate to slide along the rail assemblies so that the extension plate is movable from a stored and locked position within the cargo area to an extended position partially outside the cargo area.

In a preferred embodiment the bed extension plate would include two spring-loaded locking pins protruding outwardly from the inside of each molded track. Located at the end of the extension plate nearest to the front of the bed, the locking pins would protrude outwardly to fill horizontally drilled/molded holes integrated into the previously referenced rails at spaced intervals. This allows the extension plate to be extended and locked/secured at various lengths. When extended past the end of the lowered truck tailgate, the extension plate would rest on two composite pads integrally molded into or attached to the upper side of the tailgate portion of the drop-in bed liner for added support. Said spring-loaded pins would be retracted and released through the operation of a one-hand-operated handle at the end of the extension plate nearest to the truck tailgate. The construction of the locking mechanism would allow for the sliding bed extension plate to be easily removed from the bed liner for routine cleaning purposes or replacement if damaged.

Also, therefore, a cargo liner, for a multiple purpose vehicle, with integrated sliding load floor is provided. The cargo liner with integrated sliding load floor includes a cargo liner formed of composite/plastic materials with one or more molded composite/plastic or metal rails (encased or not in molded composite) integrally formed into or attached to the structure of the liner and a load floor/shelf plate of lightweight molded composite/plastic materials or metal plating (encased or not within a shell of composite materials), the underside of which has one or more composite/plastic and/or metal tracks integrally formed into or attached to the structure of the load floor for mounting said floor plate to the previously referenced rail/rails. An exemplary embodiment of the sliding load floor/shelf plate would have peg-receiving holes drilled/molded therein for mounting/installation of cargo restraining devices, cargo dividers, specialized containers or other such items deemed suitable for this type of application by a manufacturer.

For additional structural support potentially needed when the load floor/shelf plate is in the extended position and supporting the weight of loaded cargo, one or more horizontal torsion-rods of reinforced composite/plastic or metal (encased or not in composite materials) would be molded into or attached to the structure of the liner with non-scratch, skid-proof pads on the end of the rod/rods secured against the walls of the cargo area. For further support, one or more holes could be drilled/molded in the rails of the liner/tray for insertion of one or more shorter torsion-rods which could be secured against the ceiling (or seat back) of the vehicle when loading heavier items.

In a preferred embodiment the sliding load floor/shelf plate would include two spring-loaded locking pins protruding outwardly from the inside of each molded track. Located at the end of the load floor nearest to the back of the liner, the locking pins would protrude outwardly to fill horizontally drilled/molded holes integrated into the previously referenced rails at spaced intervals. This allows the extension plate to be extended and locked at various lengths. Said spring-loaded locking pins would be retracted and released through the operation of a one-hand operated handle at the end of the load floor nearest to the rear opening of the vehicle. The construction of the locking mechanism would allow for the sliding load floor to be easily removed from the cargo liner for routine cleaning purposes or replacement if damaged. The construction of the entire integrated assembly would also allow for easy removal from the vehicle when not in use or for routine cleaning purposes.

DESCRIPTION OF THE DRAWINGS

For a more in-depth understanding of the nature and objects of the present invention, refer to the following detailed description of the preferred embodiment and accompanying drawings, in which like elements are assigned consistent reference numbers and wherein.

DETAILED DESCRIPTION OF PREFERRED EMBODIMENT

The present invention provides a liner for truck beds and vehicle rear cargo areas that includes a sliding floor extension to enable the stored or hauled items therein to be easily removed from the rear of the truck or passenger vehicle, as well as to increase the length of the cargo area floor in the case of its application in pickup trucks. To this end, and in accordance with the principles of the present invention, there is provided a liner for a truck bed or multiple purpose vehicle rear cargo area having a pair of rails integral with or attached to the liner floor and an extension plate with a set of corresponding tracks for slidably engaging the rails of the liner. The assembly further includes a handle with a release mechanism for locking and unlocking the extension plate to permit its movement from a stored to an extended position.

Figure 1A:
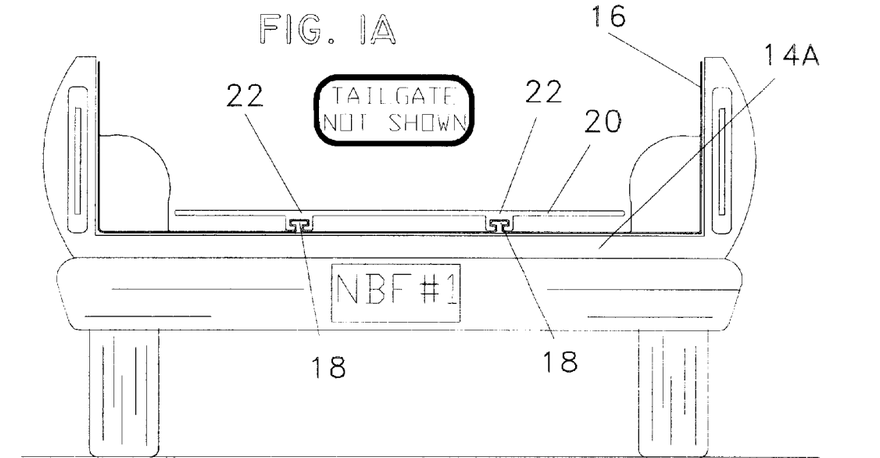
FIG. 1A is a rearward view of the bed of a representative pickup truck, without tailgate shown, depicting the existing truck bed, the wheel wells extending into the bed cargo area, the drop-in bed liner with molded rail assemblies, and the sliding extension plate with molded tracks for mounting to the rail assemblies.

Referring now to the drawings, FIG. 1A shows a pickup truck bed generally designated by the numeral 14*a*. Also shown in the figure is a drop-in bed liner 16 of composite materials with an integrally molded and identical pair of rail assemblies 18 in the floor of the liner 16 and a sliding truck bed floor extension plate 20 of composite materials or metal plating (encased or not in composite materials) slidably mounted on the liner 16 via corresponding track assemblies 22 integrally molded to the underside of the extension plate 20. Alternatively, the rail and track assemblies may be mechanically or adhesively fastened to the respective liner 16 and extension plate 20.

Figure 1B:
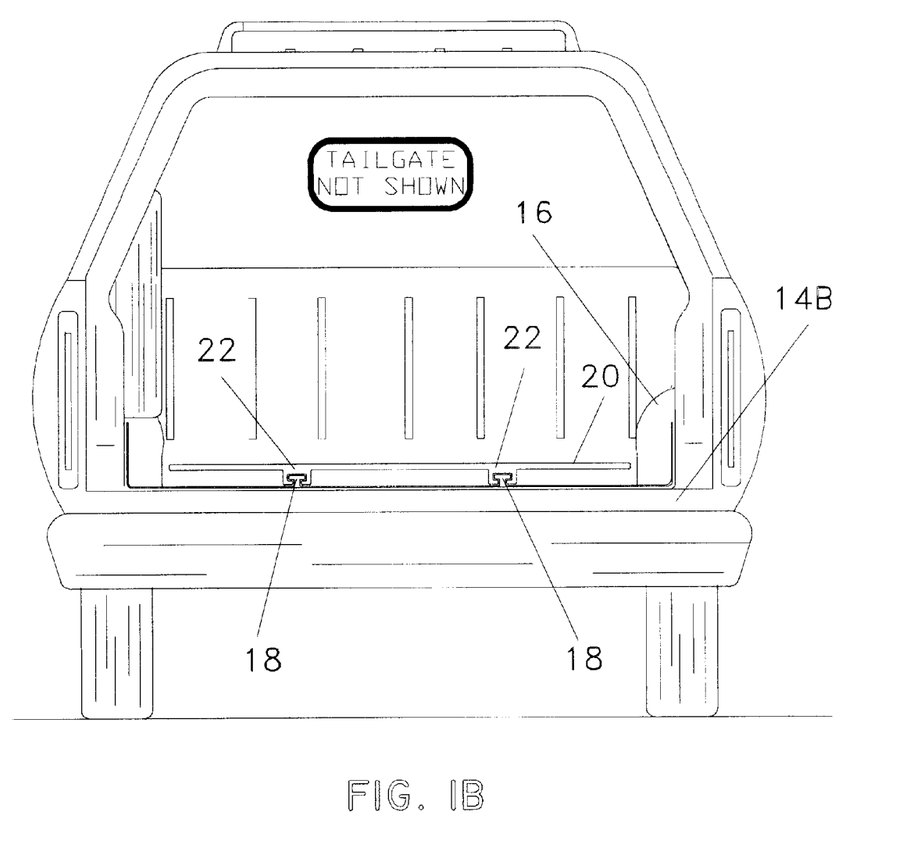
FIG. 1B is a rearward view of the cargo area of a representative sport utility vehicle without the cargo hatch in place, showing a frontal view of the cargo liner/tray in place with attached sliding floor extension.
Figure 2:
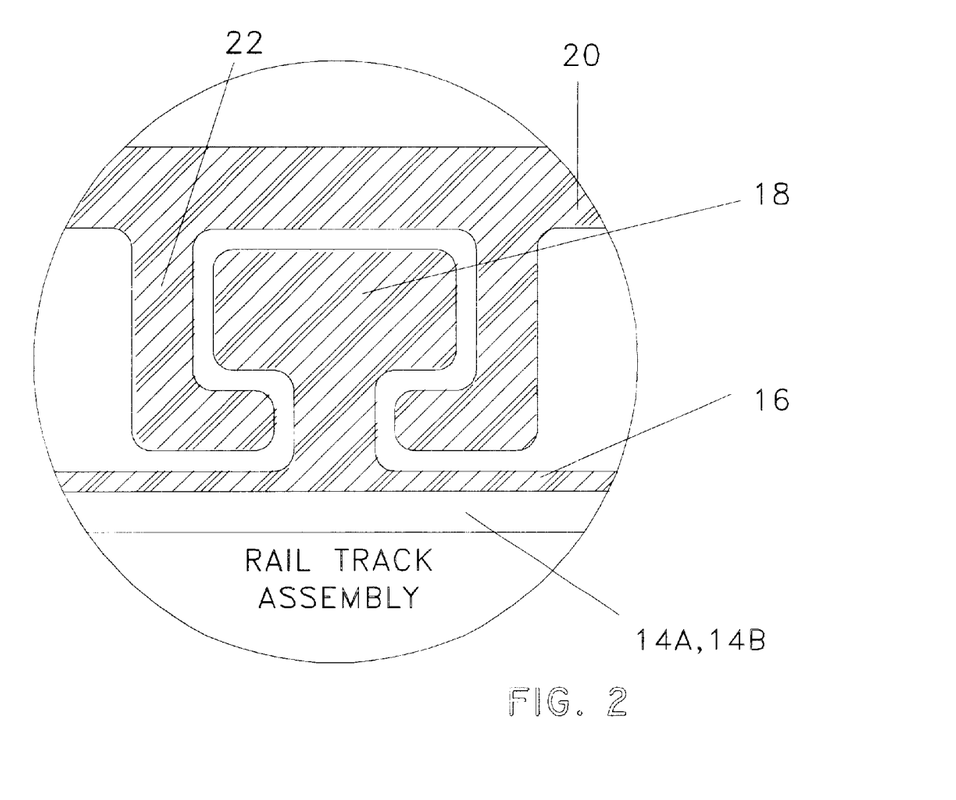
FIG. 2 is an enlarged, detailed cross-sectional view of the rail/track assembly shown in FIGS. 1A and 1B.

FIG. 1B shows a representative sport utility vehicle with the cargo area designated generally as the numeral 14b with the composite cargo liner/tray 16 in place, having molded composite rails 18 interlocking with molded composite track assemblies 22 on the underside of the sliding floor extension plate 20. FIG. 2 shows an enlarged cross-sectional view of the interlocking rail 18 and track 22 assembly of FIGS. 1A and 1B.

Figure 3A:
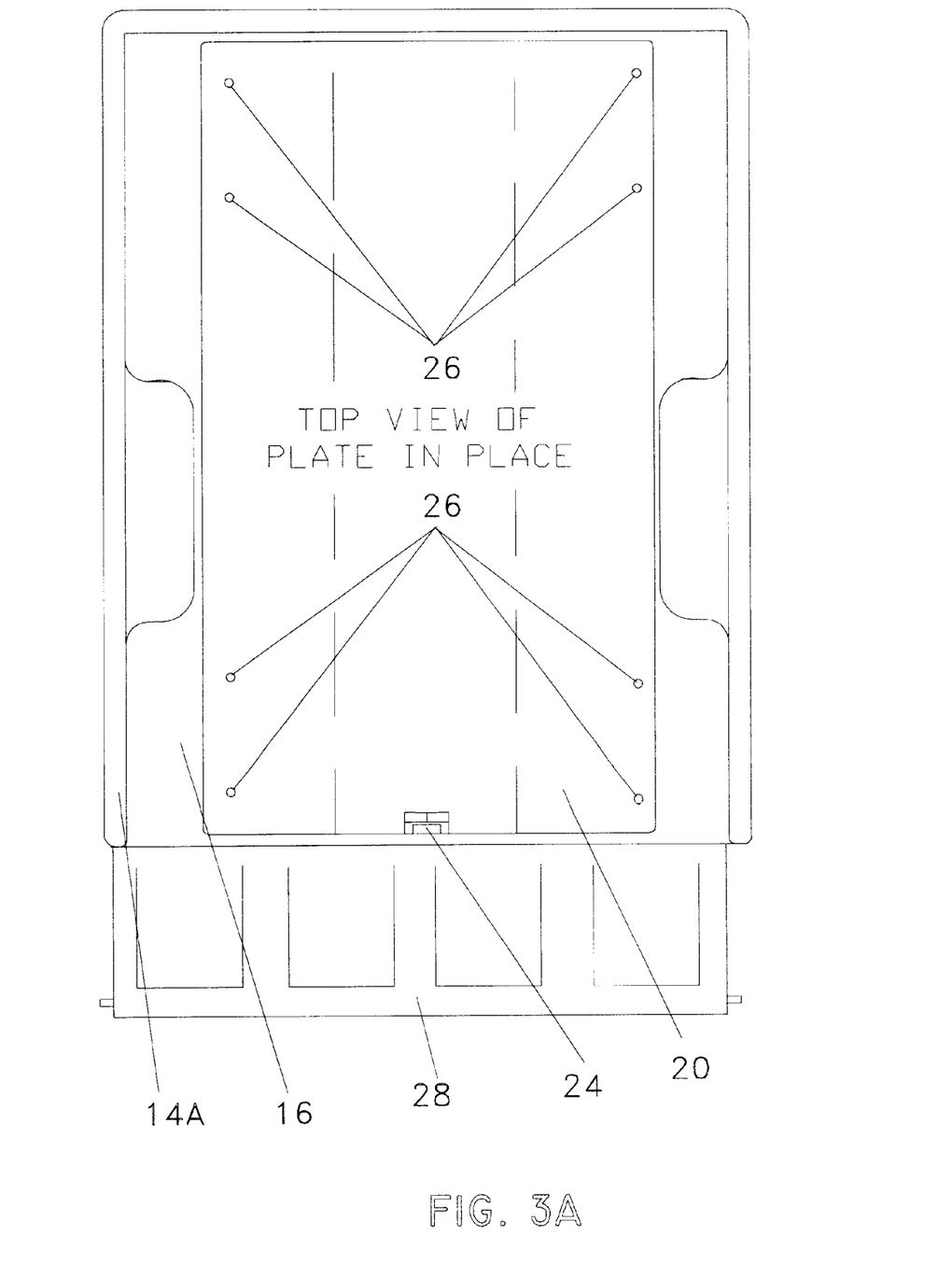
FIG. 3A is a top plan view of the representative truck bed shown in FIG. 1A with the drop-in liner in place, the tailgate down and the sliding floor extension plate mounted on the rail/track assembly shown in FIG. 1A and FIG. 2. Also shown is the handle for the locking mechanism used for locking/unlocking and moving the sliding floor extension between stored and extended positions.
Figure 3B:
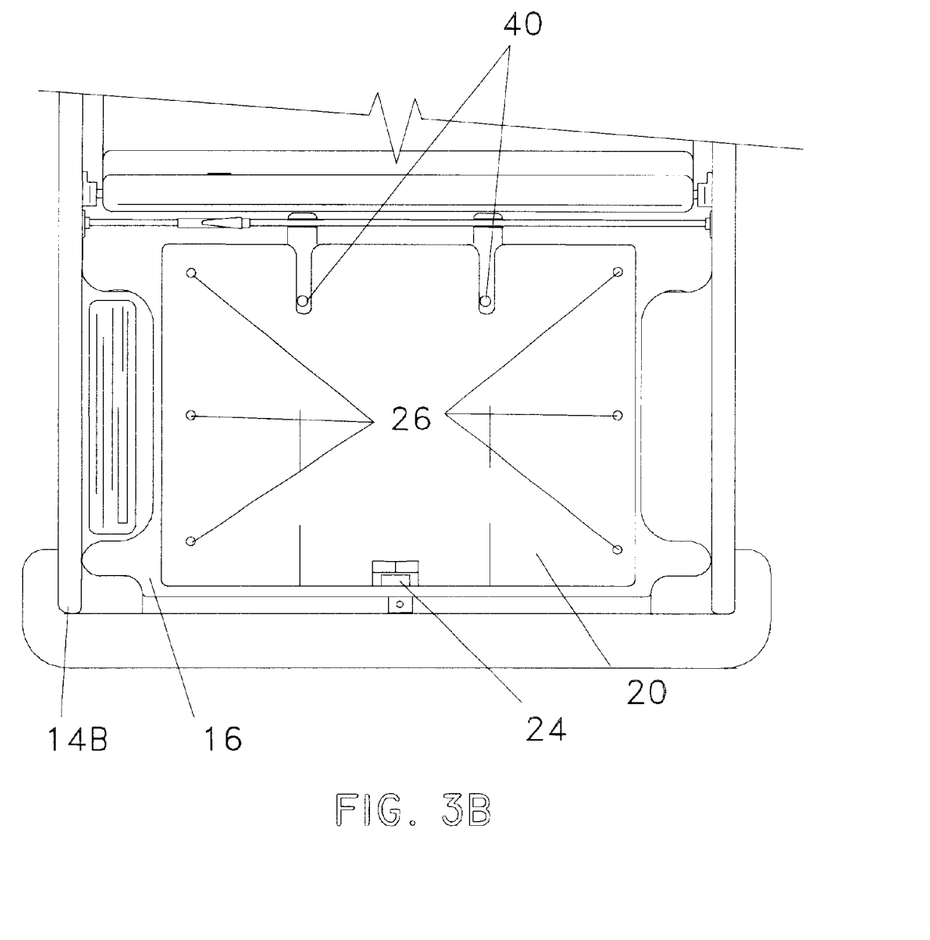
FIG. 3B is a top plan view of the cargo area of a representative sport utility vehicle showing the cargo liner/tray in place with the sliding floor extension mounted and in stored position with a torsion bar horizontally attached in the back of the liner for securing the liner/tray against the walls of the cargo area.
Figure 4A:
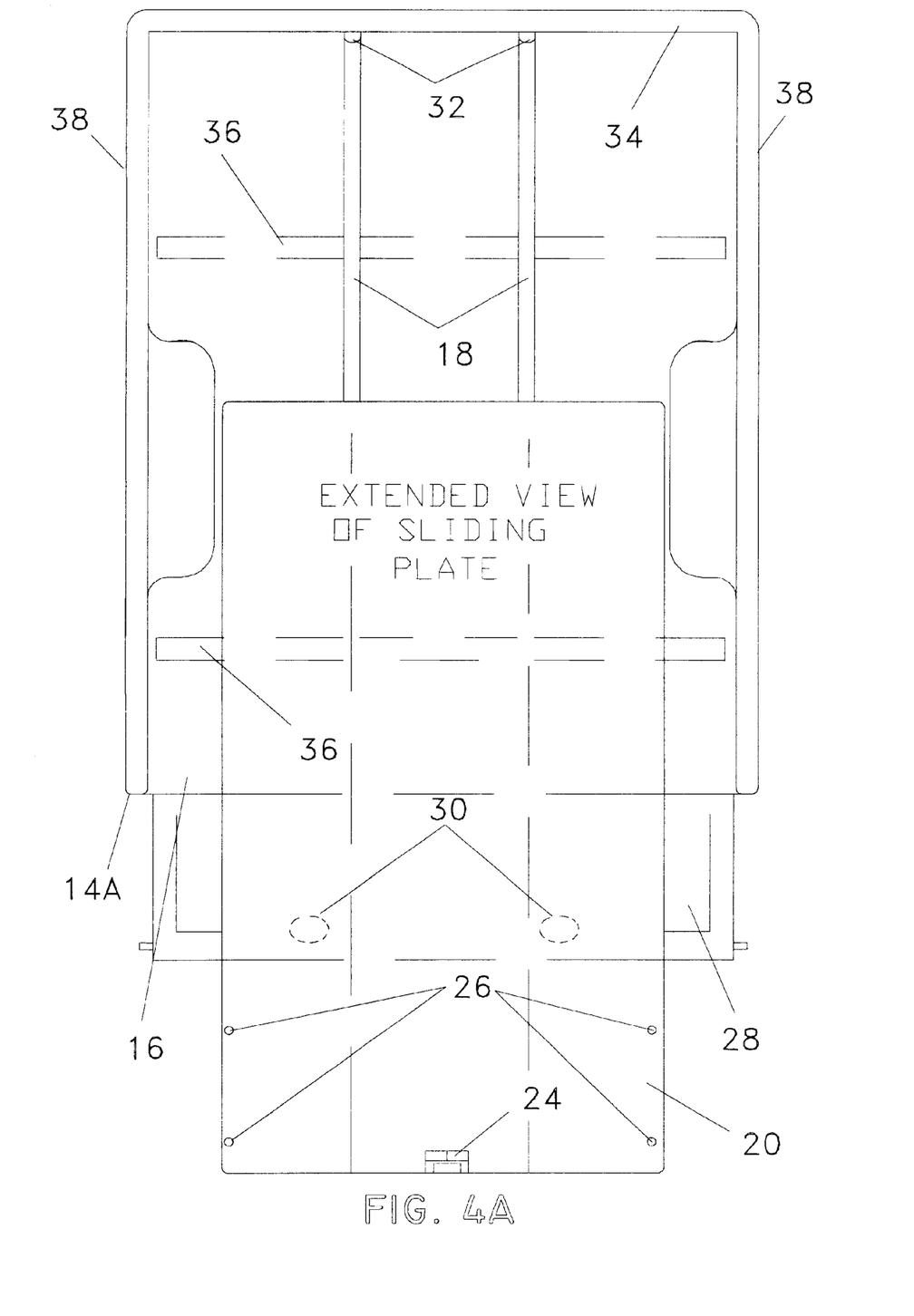
FIG. 4A is a top plan view of the representative truck bed shown in FIG. 1A with the drop-in liner in place, the tailgate down and the sliding floor extension plate mounted on the rail/track assembly shown in FIG. 1A and FIG. 2 shown in the extended position. Also shown are the two composite pads on either side of the tailgate portion of the bed liner.
Figure 4B:
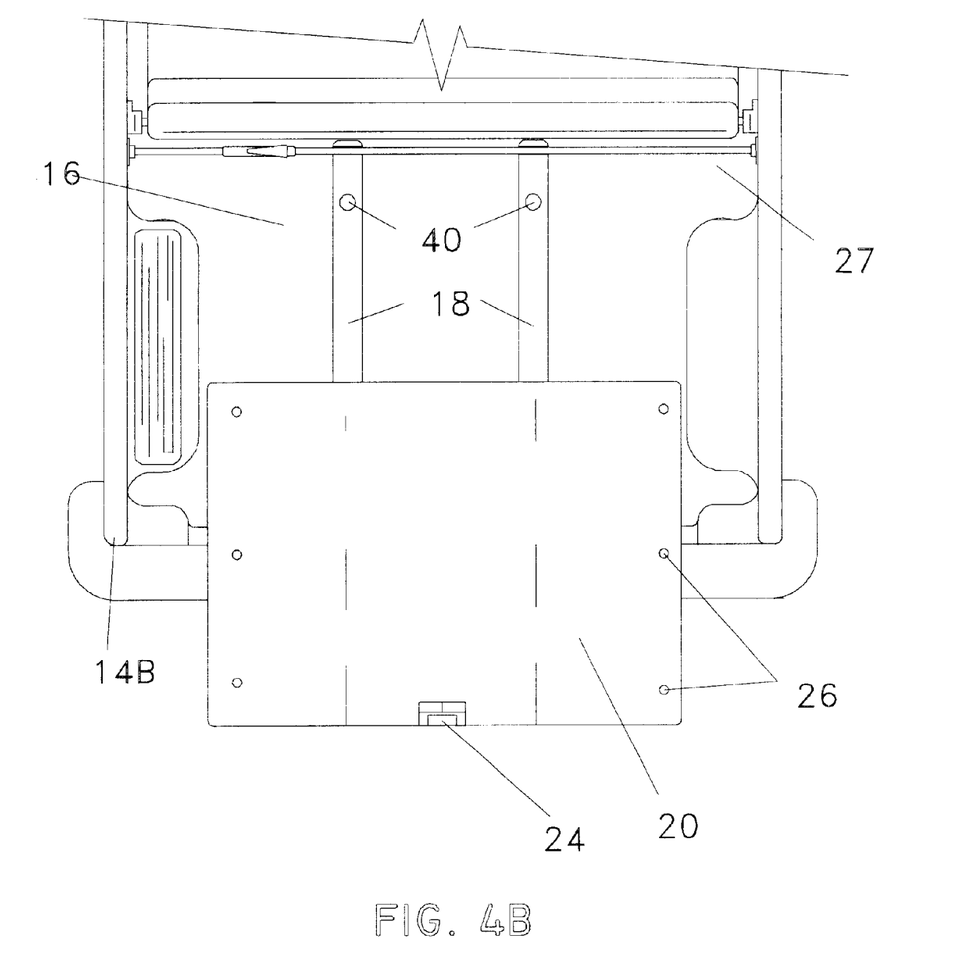
FIG. 4B is a top plan view of the cargo liner/tray assembly with sliding floor extension mounted and in the extended position.

Sliding floor extension plate 20 is extendable between a fully forward and locked position, as shown in FIGS. 3A and 3B, or an extended position, as shown in FIGS. 4A and 4B. With further reference to FIGS. 3A and 3B, a locking mechanism with release handle 24 is provided at the rearward-most edge of sliding floor extension plate 20 between stored and extended positions. The extension plate 20 may optionally further include a plurality of molded/drilled peg-receiving holes 26 for mounting cargo dividers, specialized containers, toolboxes, cargo dividers/restraining devices, etc. In FIG. 3B, a horizontal torsion bar 27 is shown attached to the back of the cargo liner/tray 12 for securing the liner via pressure against the walls of the cargo area for support when the floor extension 20 is extended and under load.

Figure 5A:
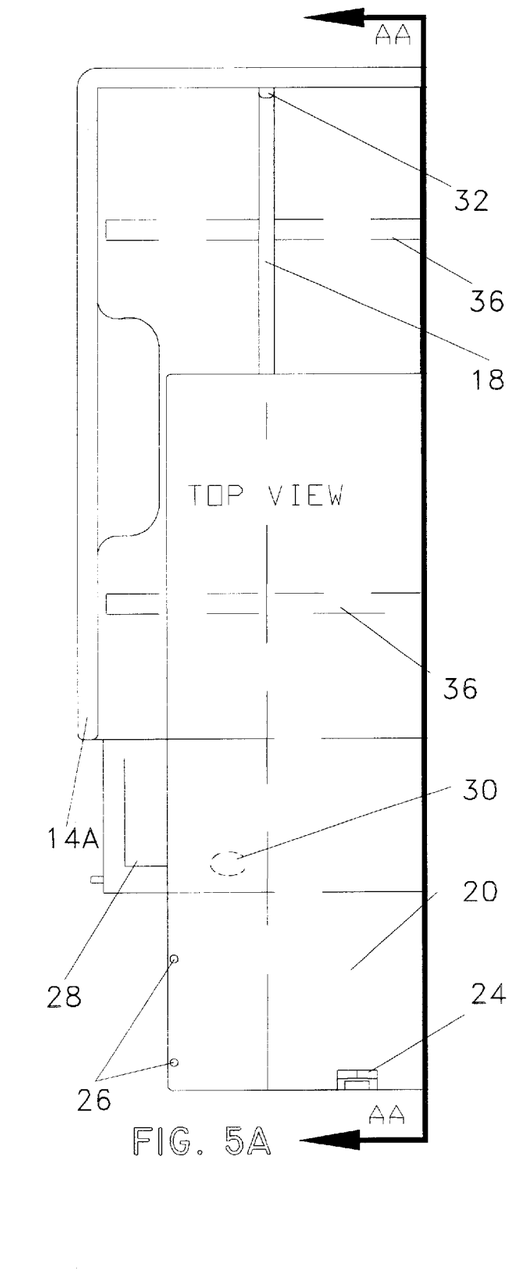
FIG. 5A shows a partial top plan view of the truck bed shown in FIG. 1A.
Figure 5B:
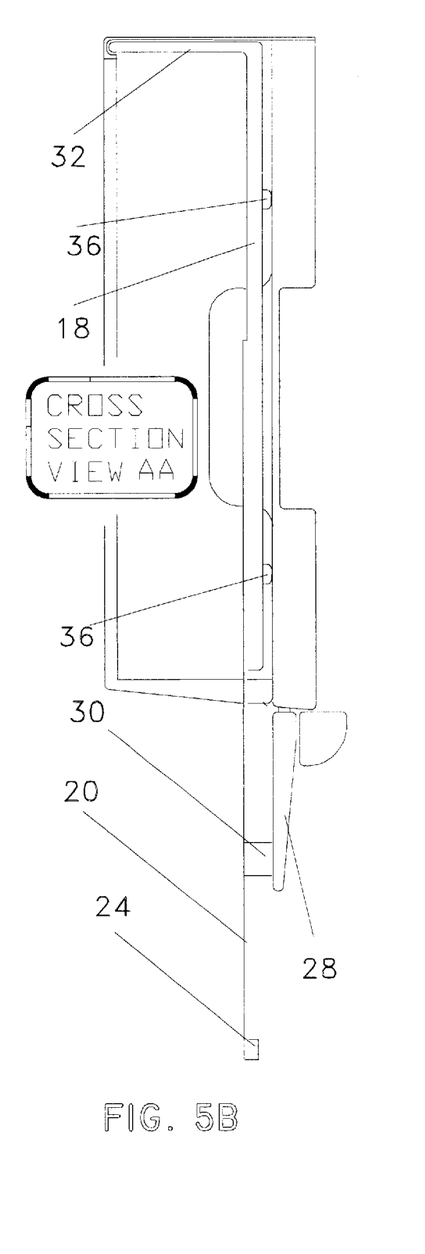
FIG. 5B shows a side cross-sectional view of the elements depicted in FIG. 5A.

With further reference to FIG. 4A, a top plan view is presented depicting the extension plate 20 mounted to the rails 18 of truck bed liner 16 and extended past a lowered tailgate 28, resting on composite pads 30 integrally molded into or fastened onto the tailgate portion of the bed liner 16. Also shown are two vertical composite/plastic or metal support rods 32 molded continuous with or attached to the rail assemblies 18 and extending forward to be secured under the lip of the front bed rail 34, and two metal and composite or reinforced composite cross-braces 36 molded horizontally into the floor of the bed liner 16 underneath rail assemblies 18 for even distribution of weight when the sliding floor extension plate 20 is in the extended position and under load. In an alternative embodiment, the support rods 32 may be integrated with or attachable to horizontal cross-brace 36 extending laterally and vertically underneath the lip of the side bed rails 38. FIGS. 5A and 5B represent a partial top plan view and a lateral cross-sectional view, respectively of the components depicted in FIG. 4A.

Figures 6A, 6B:
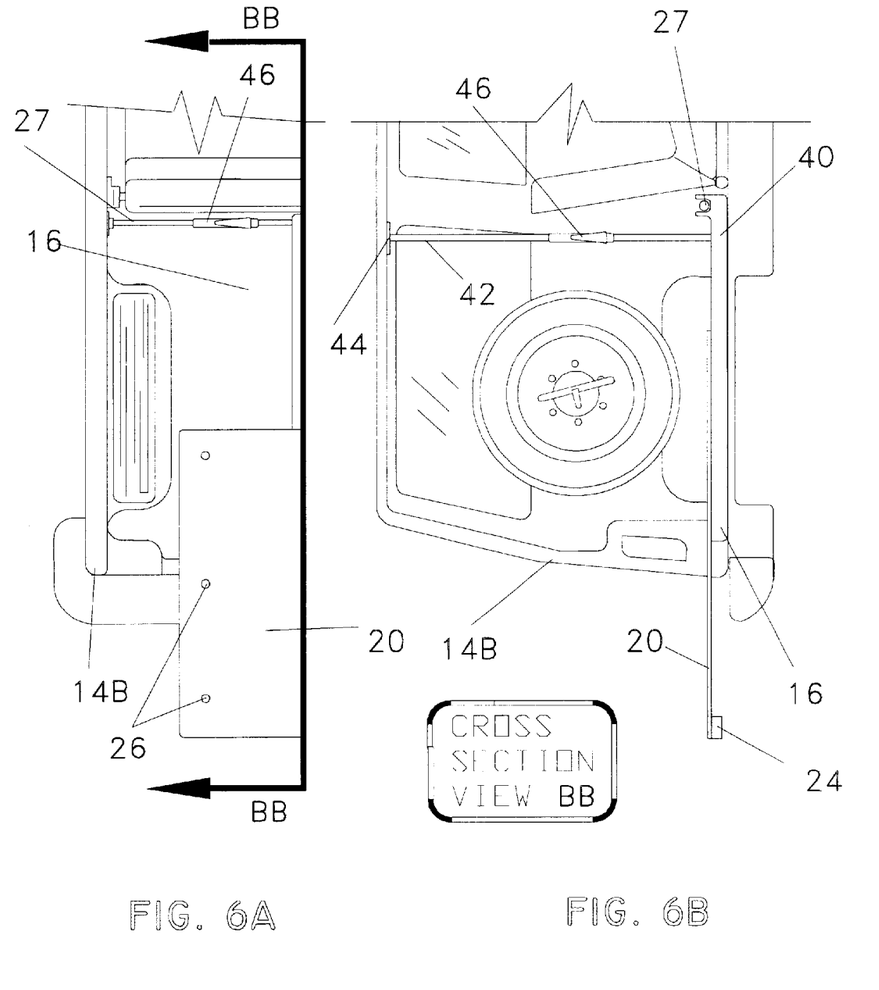
FIG. 6A shows a partial top plan view of the cargo area shown in FIG. 1B.
FIG. 6B shows a side cross-sectional view of the elements depicted in FIG. 6A.

With further reference to FIG. 4B, a top plan view is presented depicting a passenger vehicle cargo liner/tray 16 with sliding floor extension plate 20 mounted to the rails 18 of a cargo liner 16 and extended past the opening of the cargo area 14b. Also shown are two holes 40 molded/drilled into the rail assemblies 18 of cargo liner 16 for mounting of vertical torsion bars 42 to be secured against the roof of the cargo area for added support when loading heavier items onto the extended floor plate 20. FIGS. 6A and 6B present a partial top plan view and a lateral cross-sectional view of the components depicted in FIG. 4B with an addition of the vertical torsion bars 42 inserted into holes 40 in rail assemblies 18 secured against the roof of the cargo area 14b.

Figure 7:
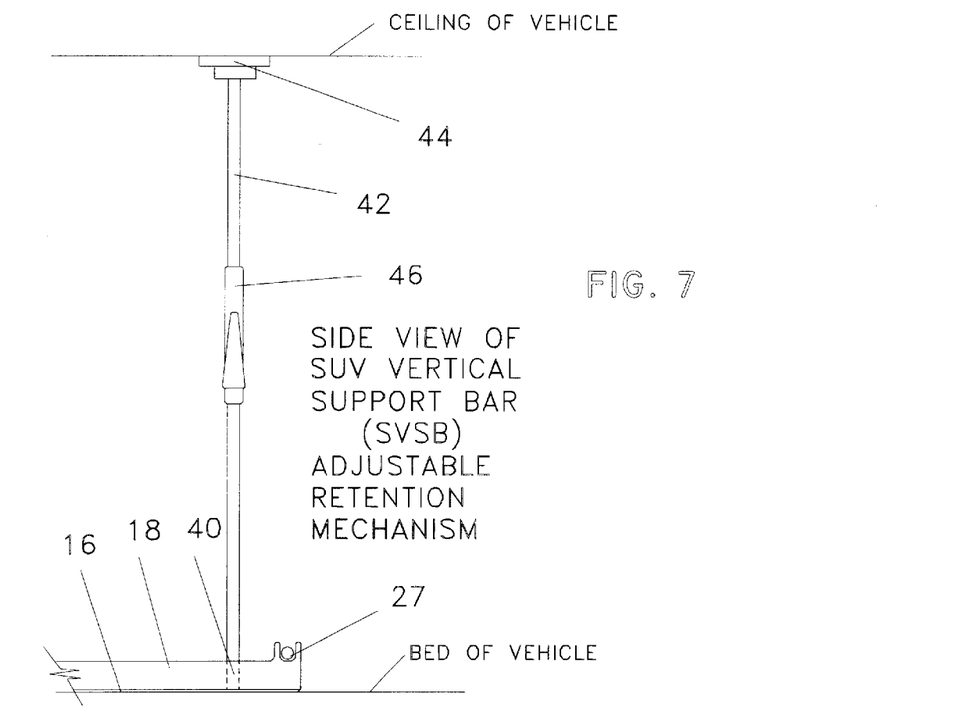
FIG. 7 depicts a side view of the SUV vertical support bar (SVSB) adjustable retention mechanism.
Figure 8:
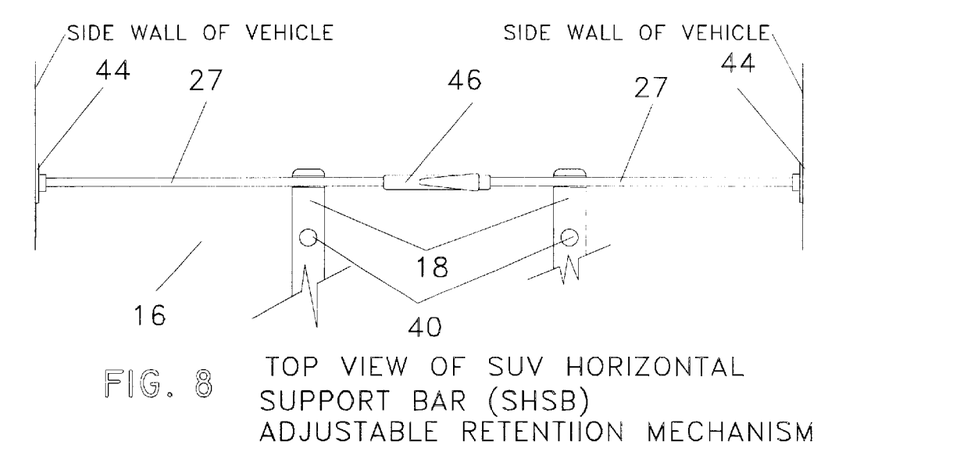
FIG. 8 shows a top view of the SUV horizontal support bar (SHSB) adjustable retention mechanism.

With reference to FIG. 7, a side view is presented of the SUV vertical support bar (SVSB), or torsion bar adjustable retention mechanism 42, and showing the skid-proof pad 44 securing the SVSB 42 against the ceiling of the vehicle, the mounting hole 40 molded/drilled into rail 18 integrally formed into liner/tray 16, and locked in place via locking mechanism 46. Also depicted in side view is the SUV horizontal support bar (SHSB) 27. FIG. 8 depicts a top plan view of the SUV horizontal support bar (SHSB) 27, or torsion bar adjustable retention mechanism, attached to liner/tray 16, secured against the sidewalls of the vehicle via the skid-proof pads 44 above rails 18, and showing the molded/drilled holes 40 in rails 18 for insertion of SVSB 42.

Figures 9, 12:
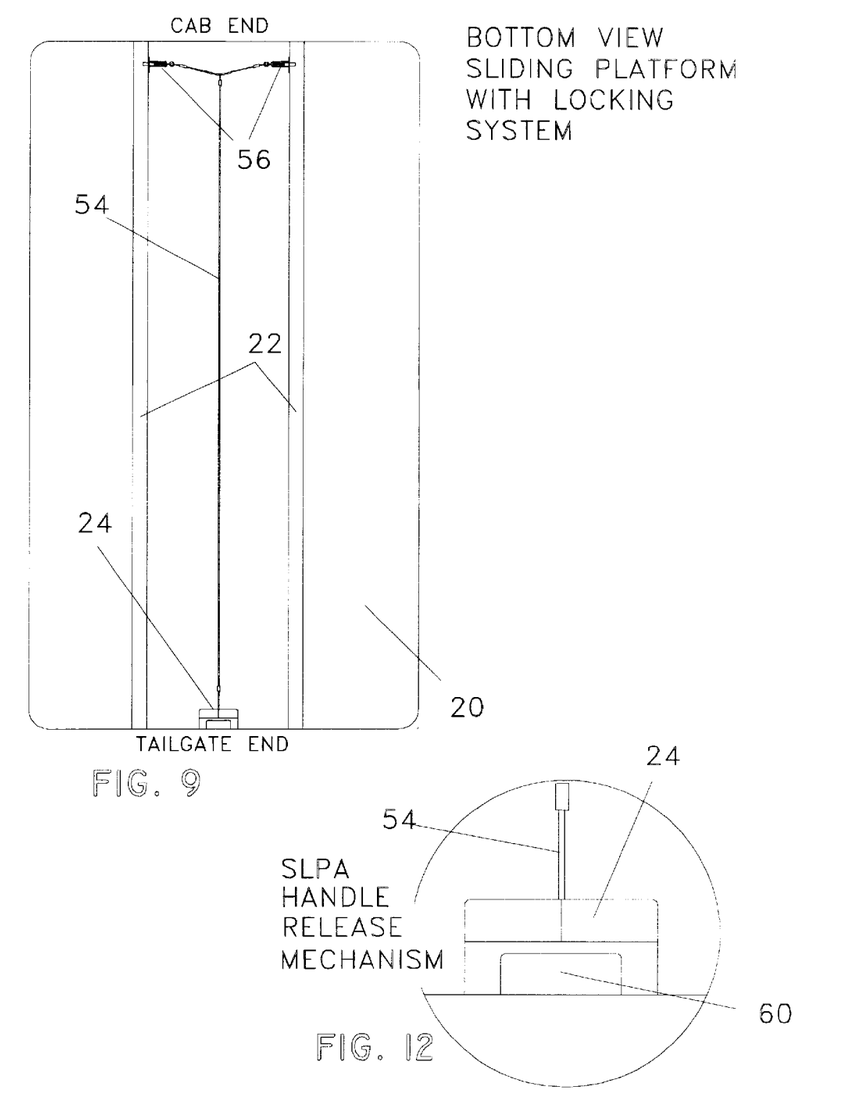
FIG. 9 shows the underside of the extension plate exposing the locking mechanism used to lock the sliding floor extension in place at spaced intervals. Extension plate-mounted components of the mechanism shown are the handle at the rearmost end of the plate, the cable connecting the handle and the two spring-loaded pins at the forward-most end of the plate projecting outwardly into the molded track assemblies.
FIG. 12 is an enlarged view of the handle release portion of the locking/unlocking mechanism used to slide and lock the sliding floor extension plate at spaced intervals.
Figure 10:
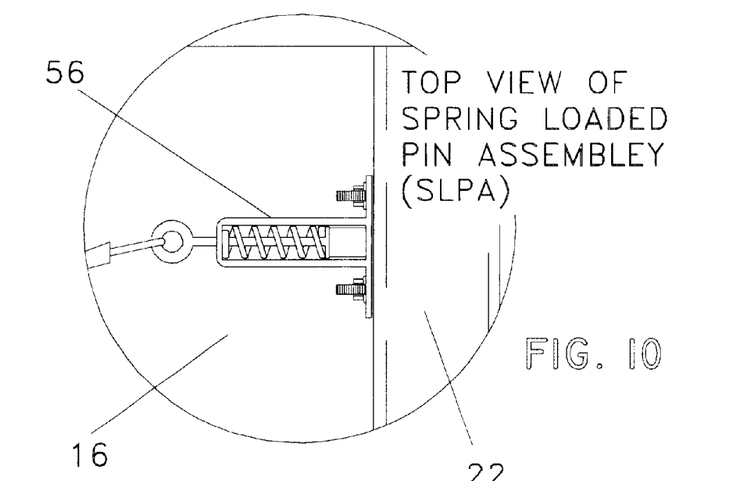
FIG. 10 shows an enlarged view of the spring-loaded locking pins in locked position within a molded/drilled hole in one of the rail assemblies in the floor of the liner.
Figure 11:
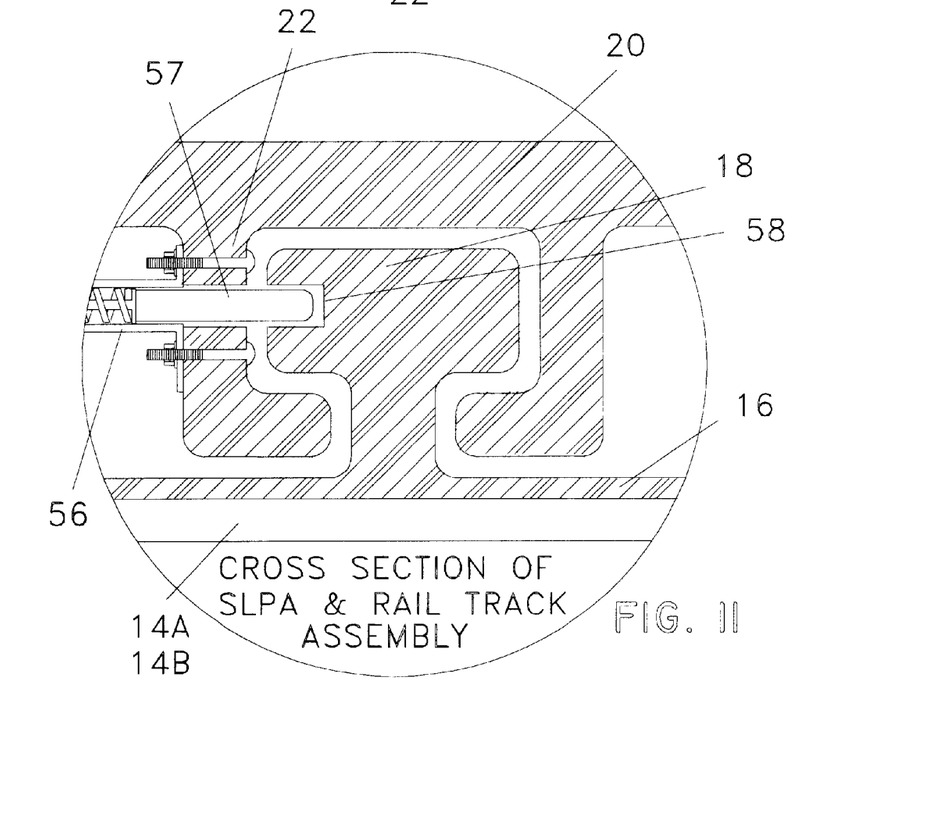
FIG. 11 shows a cross-sectional view of the rail/track assembly of FIG. 2 with the added detail of the locking mechanism of FIG. 12 in place (with the spring-loaded pin inserted into the molded/drilled hole in one of the rail assemblies in the floor of the liner)

FIG. 9 presents a view of the underside of the sliding floor extension plate 20 exposing the locking mechanism, which includes a release handle 24 and a cable 54 connecting to two spring-loaded pins 56 protruding into the molded track assemblies 22. FIG. 10 shows an enlarged view of the spring-loaded locking pin 56 in locked position with the pin 56 protruding into a hole 57 in the forward end of track assembly 22. FIG. 11 provides a cross-sectional view of the spring-loaded pin 56 in locked position in a molded/drilled hole 58 of rail assembly 18 for locking of the sliding floor extension plate 20 in place. FIG. 12 provides an enlarged view of the release trigger portion 60 of the release handle 24. The pair of rail assemblies 18 include a plurality of opposed spaced holes 58 such that as the extension plate 20 slides along the rail, the trigger portion 60 of handle 24 may be operated to engage any of said spaced holes 58 to lock the plate 20 in a particular non-extended or extended position.

CONCLUSION, RAMIFICATIONS, AND SCOPE

As communicated in the preceding description, a truck bed or cargo liner with integrated sliding floor extension has been provided that can be easily and non-invasively installed/mounted within an existing pickup truck bed or passenger vehicle cargo area, the sliding floor extension plate of which can be locked and stored in a forward, nonextended position or pulled rearwardly and locked at spaced intervals up to a fully extended position past the lowered tailgate of the truck or opening of the cargo area to allow for ease of access to load or unload items and/or to accommodate oversized load items.

It should be noted that the embodiments of the truck bed liner and the cargo liner with integrated sliding floor extension presented herein in detail for exemplary purposes is subject to variations in structure, design, application and methodology. Due to the fact that a variation of embodiments may be derived within the scope of the inventive concepts herein taught, and numerous modifications may be made to the exemplary embodiment herein presented in accordance with the descriptive requirements of the law, it should be understood that the details herein included in the detailed description of the present invention are to be interpreted as illustrative in nature and not in a limiting sense. Thus the scope of the invention should be determined by the appended claims and their legal equivalents, rather than by the examples given.

What is claimed is:

1. A vehicle cargo area liner assembly, which comprises:
    (a) a cargo liner of semi-rigid material defining a cargo area and having a floor and sidewalls;
    (b) one or more rail assemblies integrally molded into the floor, each of the one or more rail assemblies having a plurality of spaced apertures therein for receiving one or more pin members;
    (c) a floor plate having one or more track assemblies that slidably engage the one or more rail assemblies;

(d) a locking mechanism having a handle attached to one or more pin members such that the handle is operable to engage the one or more pin members in the respective apertures of the one or more rail assemblies to lock the floor plate in a first position and to disengage the one or more pin members from the respective apertures of the one or more rail assemblies to permit the floor plate to slide along the one or more rail assemblies so that the floor plate is movable from a stored and locked position within the cargo area to an extended position partially outside the cargo area;

(e) one or more horizontal torsion-rods molded into or attached to the cargo liner and having non-scratching, skid resistant pads at each end of the one or more horizontal torsion-rods secured against the sidewalls;

(f) one or more holes molded or drilled into the one or more rail assemblies for insertion of one or more vertical torsion bars.

2. The assembly of claim 1 which further comprises one or more vertical torsion bars inserted into the respective molded or drilled holes in the one or more rail assemblies and being extended against a horizontal structure of the vehicle for added support when loading heavier items.

3. The assembly of claim 2 wherein the horizontal structure is the roof of the vehicle.

4. A vehicle cargo area liner assembly, which comprises:

(a) a cargo liner defining a cargo area and having a floor and sidewalls;

(b) one or more rail assemblies integrally molded into the floor;

(c) a floor plate having one or more track assemblies that slidably engage the one or more rail assemblies;

(d) one or more horizontal torsion-rods molded into or attached to the cargo liner and having pads at each end of the one or more horizontal torsion-rods secured against the sidewalls.

5. The assembly of claim 4 wherein one or more holes are molded or drilled into the one or more rail assemblies, the assembly further comprising one or more vertical torsion bars inserted into the respective molded or drilled holes in the one or more rail assemblies and being extended against a horizontal structure of the vehicle for added support when loading heavier items.

6. The assembly of claim 4 wherein each of the one or more rail assemblies has a plurality of spaced apertures therein for receiving one or more pin members, the assembly further comprising a locking mechanism having a handle attached to one or more pin members such that the handle is operable to engage the one or more pin members in the respective apertures of the one or more rail assemblies to lock the floor plate in a first position and to disengage the one or more pin members from the respective apertures of the one or more rail assemblies to permit the floor plate to slide along the one or more rail assemblies so that the floor plate is movable from a stored and locked position within the cargo area to an extended position partially outside the cargo area.

7. The assembly of claim 4 wherein the floor plate has peg-receiving holes molded or drilled therein.

8. A vehicle cargo area line assembly for vehicle cargo area having a front bed rail with a lip, which comprises:

(a) a cargo liner of semi-rigid materials defining a cargo area and having a floor and sidewalls;

(b) one or more rail assemblies integrally molded into the floor;

(c) a floor plate having one or more track assemblies that slidably engage the one or more rail assemblies;

(d) one or more vertical support rods, each support rod continuous with or attached to and extending forward from one of the respective rail assemblies, each support rod further being secured under the lip of the front bed rail;

(e) one or more cross-braces attached to or molded into the floor and extending horizontally underneath the one or more rail assemblies.

9. The assembly of claim 8 wherein each of the one or more rail assemblies has a plurality of spaced apertures therein for receiving one or more pin members, the assembly further comprising a locking mechanism having a handle attached to one or more pin members such that the handle is operable to engage the one or more pin members in the respective apertures of the one or more rail assemblies to lock the floor plate in a first position and to disengage the one or more pin members from the respective apertures of the one or more rail assemblies to permit the floor plate to slide along the one or more rail assemblies so that the floor plate is movable from a stored and locked position within the cargo area to an extended position partially outside the cargo area.

10. The assembly of claim 8 wherein the floor plate has peg-receiving holes molded or drilled therein.

* * * * *